United States Patent
Arai et al.

[11] Patent Number: 5,984,598
[45] Date of Patent: Nov. 16, 1999

[54] ROTARY CUTTER HAVING CHIP-REPELLING MECHANISM

[75] Inventors: Tatsuo Arai; Takayoshi Saito, both of Ibaraki-ken, Japan

[73] Assignee: Mitsubishi Materials Corporation, Tokyo, Japan

[21] Appl. No.: 09/163,329

[22] Filed: Sep. 30, 1998

[30] Foreign Application Priority Data

Sep. 30, 1997  [JP]  Japan .................................. 9-267017

[51] Int. Cl.⁶ ................................................ B23C 9/00
[52] U.S. Cl. ............................................. 409/137; 408/67
[58] Field of Search ............................. 409/137; 408/56, 408/61, 67

[56] References Cited

U.S. PATENT DOCUMENTS

| | | |
|---|---|---|
| 5,017,060 | 5/1991 | Shiratori et al. . |
| 5,026,221 | 6/1991 | Arai et al. . |
| 5,090,849 | 2/1992 | Arai et al. . |
| 5,791,842 | 8/1998 | Sugata ..................................... 409/137 |

FOREIGN PATENT DOCUMENTS

| | | |
|---|---|---|
| 0 397 193 | 11/1990 | European Pat. Off. . |
| 0 407 836 | 1/1991 | European Pat. Off. . |
| 0 677 209 | 8/1995 | European Pat. Off. . |
| 277886 | 10/1993 | Japan ..................................... 409/137 |

*Primary Examiner*—Daniel W. Howell
*Attorney, Agent, or Firm*—Oblon, Spivak, McClelland, Maier & Neustadt, P.C.

[57] ABSTRACT

To enable a rotary cutter to correspond to an automatic tool exchange apparatus by adjusting, in a peripheral direction, the position of a positioning member in response to an outlet of a chip container and a key and a key seat for receiving the key of a rotary cutter and a machine tool. A chip container having an outlet is mounted on the peripheral area of a cutter body with a bearing therebetween. An arbor of the cutter body is connected to a machine tool such that a key fits into a key seat, and at the same time a positioning pin of the chip container is inserted into a fitting recess of a spindle head. A movable block ring having the positioning pin is mounted on the chip container after adjusting in a peripheral direction, and is fastened with a bolt. Even when a key of the machine tool and a fitting recess differ in a peripheral direction, they can be adjusted. The relative position in a peripheral direction between the outlet of the chip container and the positioning pin can be adjusted.

20 Claims, 6 Drawing Sheets

ROTARY CUTTER HAVING CHIP-REPELLING MECHANISM

BACKGROUND OF THE INVENTION

1. Field of the Invention

The present invention relates to a rotary cutter capable of consecutively recovering chips resulting from cutting when the rotary cutter is surrounded by a chip container. In particular, the invention relates to a rotary cutter which is suitable for a machine tool provided with an automatic tool exchange apparatus, for example, a machining center.

This application claims priority of Japanese Patent Application HEI 9-267017 which is hereby incorporated by reference.

2. Discussion of the Background

An example of such a rotary cutter having a chip-repelling mechanism is the one disclosed in Japanese Patent Publication No. 3-281114.

The rotary cutter will be described with reference to FIG. 7.

A rotary cutter 1, for example, a face milling cutter, includes a plurality of tips 3 provided at a given distance on the top periphery of a cutter body 2, as shown in FIG. 7. A chip guide section 4 is mounted on the top periphery of the cutter body 2, and the chip guide section 4 faces to the cutting faces of the top cutting edges and the peripheral cutting edges of the tips 3 with a space therebetween. An arbor 5 is fitted into the base of the cutter body 2 and coaxially fixed with a bolt 6. Also, a substantially cylindrical chip container 7 is arranged on the peripheral area of the cutter body 2, and the base of the chip container is mounted on the arbor 5 with a bearing 8 therebetween so as to be relatively rotatable. An outlet 9 for recovering the chips is formed on the peripheral area of the chip container 7.

The arbor 5 connects the cutter body 2 to a main spindle 12 supported by a spindle head 11 of a machine tool 10, and is mounted on the main spindle 12 with a pull-stud 14 being pulled in toward the rear end of the main spindle while its taper shank 13 is fitted into the main spindle 12. A key seat 15 of the arbor 5 is brought into engagement with a key 12a of the main spindle 12, and thus the rotation of the main spindle 12 is transmitted to the cutter body 2. The arbor 5 includes a grip 16 which can be brought into engagement with a tool exchange arm (not shown in the drawing) of an automatic tool exchange apparatus provided on the machine tool 10.

A constrained mechanism 17 which is connected to the bearing 8 is integrally formed on the base of the chip container 7, and the constrained mechanism 17 is provided with a fitting hole 18 which is opposed to the spindle head 11 of the machine tool 10. A positioning pin 20 is slidably inserted within the fitting hole 18 with a compressed spring 19 underneath. The tip of a bolt 22, which is horizontally screwed into the constrained mechanism 17 toward the center of the arbor, protrudes and is retained in a groove 20a of the positioning pin 20, and thus, the moving range of the positioning pin 20 along the axis of the cutter body 2 is restricted.

Also, a fitting recess 23 is formed on the spindle head 11 for receiving a tip 20b of the positioning pin 20 while the arbor 5 is mounted on the main spindle 12. A retainer 20c which horizontally protrudes toward the center of the cutter body 2 is formed in the middle of the positioning pin 20, and the retainer 20c is engageable with a recess 24 provided on the periphery of the arbor 5.

Accordingly, when the arbor 5 is not mounted on the main spindle 12 of the machine tool 10, the positioning pin 20 of the constrained mechanism 17 moves up until the tip of the bolt 22 is brought into engagement with the lower end of the groove 20a by means of elasticity of the spring 19, and the retainer 20c is brought into engagement with the recess 24 of the arbor 5 whereby the relative rotation between the arbor 5 and the chip container 7 (constrained mechanism 17) is resisted. Also, when the arbor 5 is mounted on the main spindle 12, the tip 20b of the positioning pin 20 is inserted within the fitting recess 23 of the spindle head 11, the positioning pin 20 is pushed down into the fitting hole 18 against the force of the spring 19, and the tip of the bolt 22 is brought into engagement with the upper end of the groove 20a. In such a state, the retainer 20c is detached from the recess 24 of the arbor 5, and the cutter body 2 is relatively rotatable toward the fixed chip container 7.

As shown in FIG. 8, a table 27 of the machine tool 10 for placing a material 26 to be cut may include a mechanism having a conveyor 28 for transporting chips in parallel to the material 26 to be cut in the relative feeding direction of the cutter body 2. In such a machine tool 10, the outlet 9 of the chip container 7 is set to face toward the conveyor 28, and cutting is performed while the cutter body 2 (or the material 26 to be cut) is being moved parallel to the conveyor 28.

During the cutting process, while the arbor 5 is mounted on the main spindle 12, if the top cutting edges and the peripheral cutting edges of the cutter body 2 are pressed onto the material 26 to be cut, and are moved, for example, in the direction of an arrow A in FIG. 8 for cutting, the chips produced by each cutting edge are forcibly led into the chip container 7 through a space between the chip guide section 4 and the cutting faces of the tips 3, and then, they are removed toward the inner peripheral area of the chip container 7 by means of a centrifugal force of the rotating cutter body 2, repelled out of the outlet 9 onto the conveyor 28, and received by a recovery box or the like (not shown in the drawing).

In the machine tool 10, the key 12a and the fitting recess 23 of the spindle head 11 are in predetermined positions, and, on the other hand, in the rotary cutter 1, the key seat 15 of the arbor 5 and the positioning pin 20 provided on the constrained mechanism 17 are in predetermined positions. However, the machine tool 10 may include a key 12a and a fitting recess 23 which are arranged in positions that angularly deviate from the predetermined positions of the key seat 15 and the positioning pin 20. In such a case, unless, for example, manually, the retainer 20c of the positioning pin 20 is detached from the recess 24 of the arbor 5 and the chip container 7 is relatively rotated for positional adjustment, the positional pin 20 cannot be fitted into the fitting recess 23 of the spindle head 11 while the key seat 15 of the arbor 5 is fitted into the key 12a of the main spindle 12.

Also, for example, because of the above-mentioned configuration angle, while the positioning pin 20 of the constrained mechanism 17 is fitted into the fitting recess 23 of the spindle head 11, the outlet 9 of the chip container 7 may not face the conveyor 28 for recovering chips on the table 27. In such a case, an efficient recovery of chips by the conveyor 28 cannot be performed.

SUMMARY OF THE INVENTION

In view of the circumstances described above, it is an object of the present invention to provide a rotary cutter having a chip-repelling mechanism in which the angular positions of a positioning member to an outlet of a chip container and a key seat, a key, or the like of an arbor in the rotary cutter can be freely adjusted in a peripheral direction.

A rotary cutter having a chip-repelling mechanism in accordance with the present invention includes a cutter body having cutting edges on its top periphery, a chip container having a chip outlet provided on the peripheral area of the cutter body, and a positioning member provided on the chip container which is connected to a machine tool when an arbor mounted on the cutter body is connected to the machine tool. The positioning member is detachably mounted on the chip container by a fitting member, and the positioning member can be adjusted in a peripheral direction in response to a mounting position of the fitting member.

In accordance with the present invention, even when a key or a key seat of the machine tool and a part of the machine tool for connecting the positioning member do not correspond to a key seat or a key of the arbor and the position of the positioning member, the alignment can be performed by adjusting the position of the positioning member in a peripheral direction.

The present invention is particularly advantageous when automatically mounting and removing a rotary cutter with an automatic tool exchange apparatus.

Also, the position of the positioning member to an outlet in a peripheral direction may be adjustably set.

When, for example, the positions of a conveyor for transporting chips, a chip recovery box, and the like are predetermined, the outlet of the chip container must be set to face toward them, and even in such a case, by adjusting the positioning member in the direction of the periphery of the chip container, the positioning member and the key seat or the key of the arbor can be easily aligned with the machine tool.

Also, the arbor and the machine tool are connected so as to be integrally rotated by fitting a key of either into a key seat of another, and the position of the positioning member to the key seat or the key of the arbor in a peripheral direction may be adjustably set.

When mounting the rotary cutter on the machine tool, by adjusting the position of the positioning member in a peripheral direction toward the key seat or the key of the arbor in response to the machine tool, the rotary cutter can correspond to any type of machine tool.

The positioning member may be provided with a retainer, the arbor may be provided with an engaging section which is engageable with the retainer, and a plurality of engaging sections may be provided in a peripheral direction of the arbor.

Or, the positioning member may be provided with a retainer and the arbor may be provided with a supporting member having an engaging section which is engageable with the retainer in a detachable manner so that the position of the engaging section can be adjusted in a peripheral direction in response to the mounting position of the supporting member.

In either case, when the position of the positioning member is moved in a peripheral direction, by adjusting the position of the engaging section of the arbor in response to this, the relative rotation between the rotary cutter and the chip container can be resisted while the rotary cutter is not mounted on the machine tool.

Also, a through-hole for passing air fed from the machine tool may be formed on the positioning member so that the air passing through the through-hole is fed into at least one of the air amplifiers provided in the chip container or on the outlet via an air channel.

By using a connecting mechanism between the chip container and the machine tool also as an air feeding mechanism, the structure of the air feeding mechanism can be simplified, enabling a decrease in the occupied space.

The present invention is advantageous when mounting or removing the rotary cutter on or from the machine tool with an automatic tool exchange apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
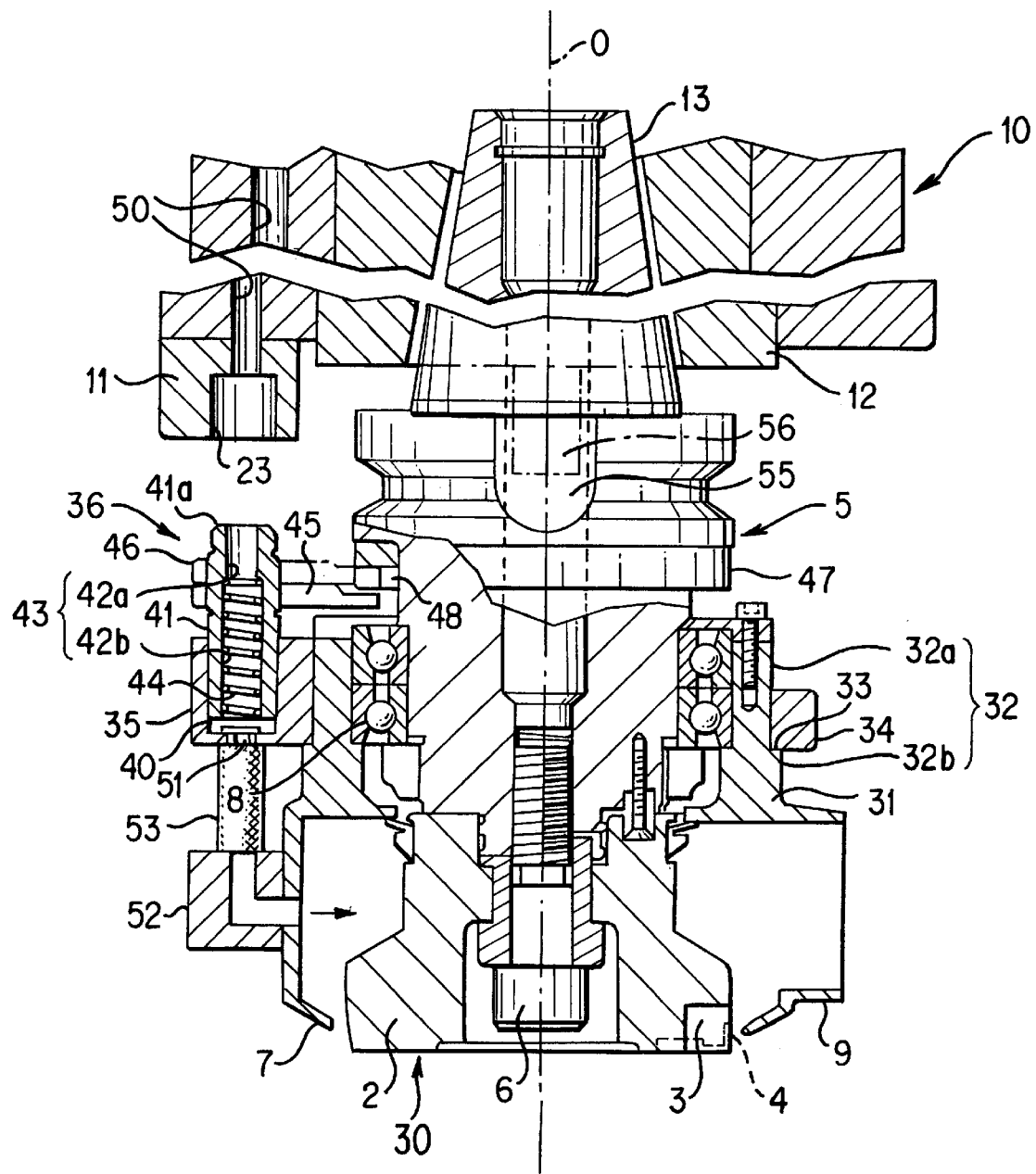
FIG. 1 is a longitudinal sectional view showing the main part of a rotary cutter as a first embodiment of the present invention before being fitted into a main spindle of a machine tool.
Figure 2:
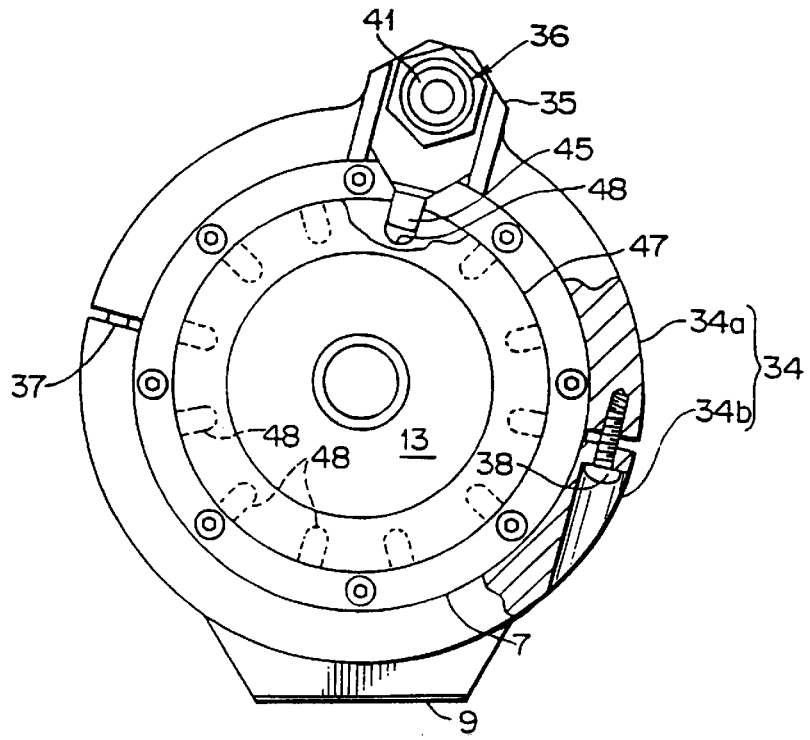
FIG. 2 is a partial plan view of the rotary cutter shown in FIG. 1 viewed from the base.

A first embodiment of the present invention will be described with reference to FIGS. 1 to 3. The same reference numerals will be used for the parts which are the same as or similar to those of the related art described above, and a description thereof will be omitted. FIG. 1 is a longitudinal sectional view showing the main part of a rotary cutter as the first embodiment before being fitted into a main spindle of a machine tool. FIG. 2 is a partial plan view of the rotary cutter shown in FIG. 1 viewed from the base, and FIG. 3 is a bottom plan view of the rotary cutter shown in FIG. 1 viewed from the top.

Figure 3:
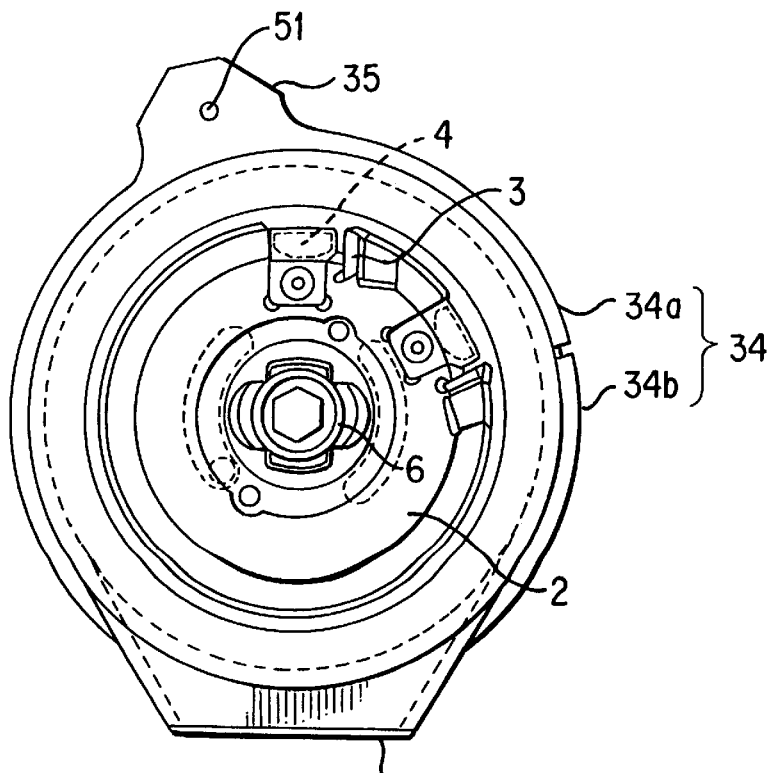
FIG. 3 is a bottom plan view of the rotary cutter shown in FIG. 1 viewed from the top.

The rotary cutter shown in FIGS. 1 to 3 is, for example, a face milling cutter 30. A chip container 7, which is mounted on a cutter body 2 with a bearing 8 therebetween so as to cover the peripheral area of the cutter body, includes a base 31 connected to the peripheral area of the bearing 8. A peripheral area 32 of the base 31 is cylindrical with the axis 0 of the cutter body 2 as a central axis, and is provided with a step 33, and a top peripheral area 32a over the step has a radius which is slightly smaller than that of a bottom peripheral area 32b under the step.

An annular block ring 34 (fitting member) is detachably mounted around the top peripheral area 32a, and a part of the block ring 34 extends radially outward to form an extended section 35. A positioning pin 41 (positioning member) which is engageable with a filling recess 23 of a spindle head 11 is mounted on the extended section 35.

As shown in FIG. 2, the block ring 34 is divided into two semicircular parts 34a and 34b, which are connected, for example, with a hinge 37 so as to be opened. In the closed state, with the other ends of the semicircular parts 34a and 34b being opposed to each other, one semicircular part 34a and the other semicircular part 34b can be connected with a bolt 38.

Also, the extended section 35 shown in FIG. 1 is provided with an insertion hole 40 parallel to the axis 0, and the positioning pin 41 which is movably inserted within the insertion hole 40 is provided with a through-hole 43 comprising an upper hole 42a with a small radius and a lower hole 42b with a large radius. A compressed spring 44 is mounted on the bottom of the insertion hole 40 through the lower hole 42b of the positioning pin 41. A positioning arm 45 (retainer) which extends substantially perpendicular to the positioning pin 41 is fixed with a hexagonal nut 46 or the like to the positioning pin 41 below a top end 41a to be inserted within a fitting recess 23 of the spindle head 11.

Recesses 48 (engaging sections) of an arbor 5 which are engageable with the positioning arm 45 are formed on a flange 47 of the arbor 5 at a given distance in a peripheral direction all along the periphery (refer to FIG. 2).

The positioning pin 41, the spring 44, and the positioning arm 45 constitute a positioning section 36.

Also, a communicating hole 50 is connected to the fitting recess 23 of the spindle head 11 for passing compressed air fed from an air feeder, for example, an airjet pump (not shown in the drawing) so that compressed air is fed through the through-hole 43 while the positioning pin 41 is inserted within the fitting recess 23.

In the extended section 35, a hole 51 is formed on the bottom of the insertion hole 40. An air feed pipe 52 is mounted on the exterior of the chip container 7, at a position which lies horizontally, for example, by 180 degrees, away from an outlet 9 for connecting the chip container 7 with its exterior. Also, the air feed pipe 52 and the hole 51 of the extended section 35 are connected via an air hose 53 (air channel). Accordingly, while the positioning pin 41 is inserted into the fitting recess 23 of the spindle head 11, air which is fed from the air feeder is fed into the chip container 7, and blows the chips in the chip container 7 to repel them out of the outlet 9.

Also, on the periphery of the arbor 5, one pair of key seats 55 and 55 (in FIG. 1 one key seat only is shown) are provided at opposing positions to each other, for example, by 180 degrees. By fitting, for example, one pair of keys 56 and 56 (shown by a dashed line in FIG. 1), provided on the main spindle 12 of the machine tool 10, into the key seats 55 and 55, the arbor 5 and the cutter body 2 are rotated together with the main spindle 12.

Since the face milling cutter 30 in accordance with this embodiment has the structure described above, before the arbor 5 mounted on the cutter body 2 is mounted on the machine tool 10 from the bottom (refer to FIG. 1), in response to the position of a conveyor 28 on a table 27 of the machine tool 10 and the angular positions of, for example, one pair of keys 56 of the main spindle 12, the key seat 55 of the arbor 5 is set to agree with the key 56 and also the outlet 9 of the chip container 7 is set to face the conveyor 28 by relatively rotating the chip container 7 around the cutter body 2 by means of a bearing 8.

Then, the block ring 34 is mounted on the top peripheral area 32a of the base 31 of the chip container 7, and, with the positioning pin 41 of the extended section 35 being positioned opposite to the fitting recess 23 of the spindle head 11, the semicircular parts 34a and 34b are closed and fastened with the bolt 38. At this stage, the positioning arm 45 of the positioning pin 41 is fitted into a recess 48 of the flange 47 of the arbor 5, and thus, the relative rotation between the chip container 7 and the arbor 5 or the cutter body 2 is resisted.

Next, by transferring the arbor 5 positioned as described above together with the cutter body 2 and the chip container 7 by means of an automatic tool exchange apparatus in the direction of the axis 0, the arbor 5 is fitted into the main spindle 12, and the key 56 of the main spindle 12 is fitted into the key seat 55 of the arbor 5, and at the same time a top end 41a of the positioning pin 41 is fitted into the fitting recess 23 of the spindle head 11. The positioning pin 41 which has been fully fitted into the fitting recess 23 compresses the spring 44 and is depressed into the insertion hole 40 of the extended section 35, and the positioning arm 45 moves downward out of the recess 48 of the flange 47. Thus, while the chip container 7 is fixed by the machine tool 10, the arbor 5 and the cutter body 2 can be rotated together with the main spindle 12.

Figure 8:
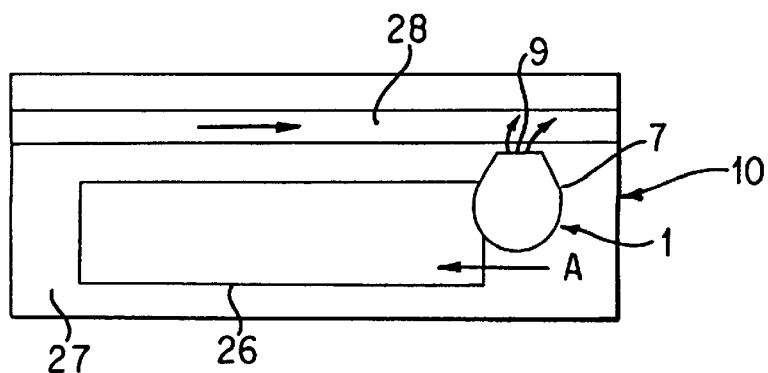
FIG. 8 is a plan view schematically showing the state in which a material to be cut that is placed on a table of a machine tool is cut with the rotary cutter shown in FIG. 7.

While maintaining the state as described above, the peripheral cutting edges and the top cutting edges of the cutter body 2 are pressed onto a material 26 to be cut on the table 27, and are moved, for example, in the A direction in FIG. 8, for cutting. The chips produced by the peripheral cutting edges and the top cutting edges are forcibly led into the chip container 7 through a space between the chip guide section 4 and the cutting faces of the tips 3. Since compressed air which is fed from the air feeder of the machine tool 10 is blown into the chip container 7 through the communicating hole 50, the through-hole 43 in the positioning pin 41, the hole 51, the air hose 53, and the air feed pipe 52, the chips led into the chip container 7 are swept off toward the outlet 9 and blown out of the outlet 9 onto the conveyor 28 for recovery.

As described above, in accordance with the embodiment, the angular positions of the outlet 9 of the chip container 7 and the positioning pin 41 can be freely adjusted in a peripheral direction, and even if the mounting position of the positioning pin 41 to the machine tool 10 is predetermined, the outlet 9 can be set at a selected direction. Also, even if the position of the key 56 and the position of the fitting recess 23 of the spindle head 11 differ angularly depending on the kind of machine tool 10, and the position of the outlet 9 of the chip container 7 is predetermined, the angular position of the positioning pin 41 to the key seat 55 of the arbor 5 in a peripheral direction can be freely adjusted to agree with each other by means of the block ring 34, and the cutter body 2 can be mounted on various machine tools 10 by using an automatic tool exchange apparatus.

Also, by using the connecting mechanism between the machine tool 10 and the chip container 7, air for repelling chips can be fed into the chip container 7, enabling efficient recovery of the chips.

Figure 4:
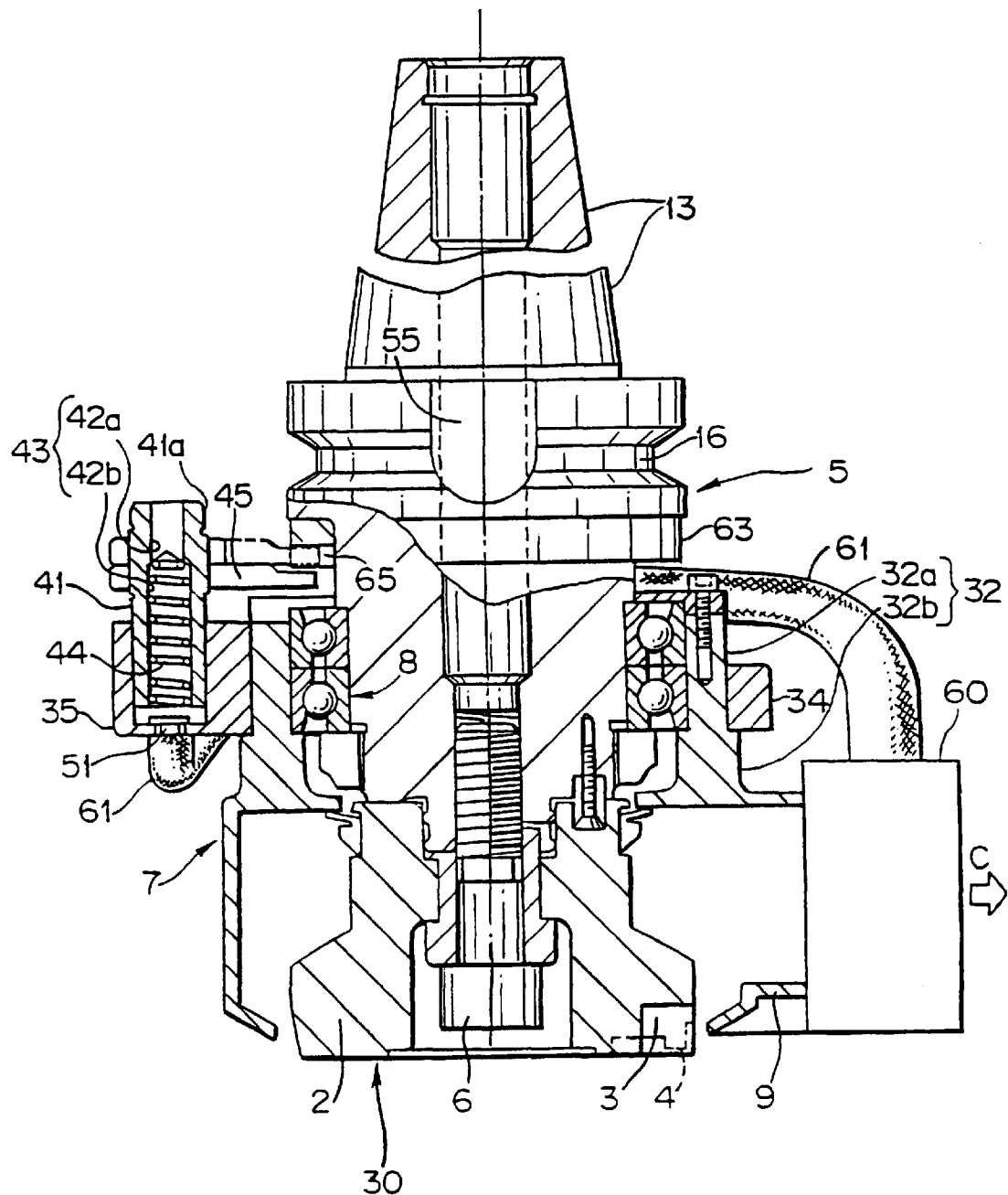
FIG. 4 is a longitudinal sectional view showing the main part of a rotary cutter as a second embodiment.
Figure 5:
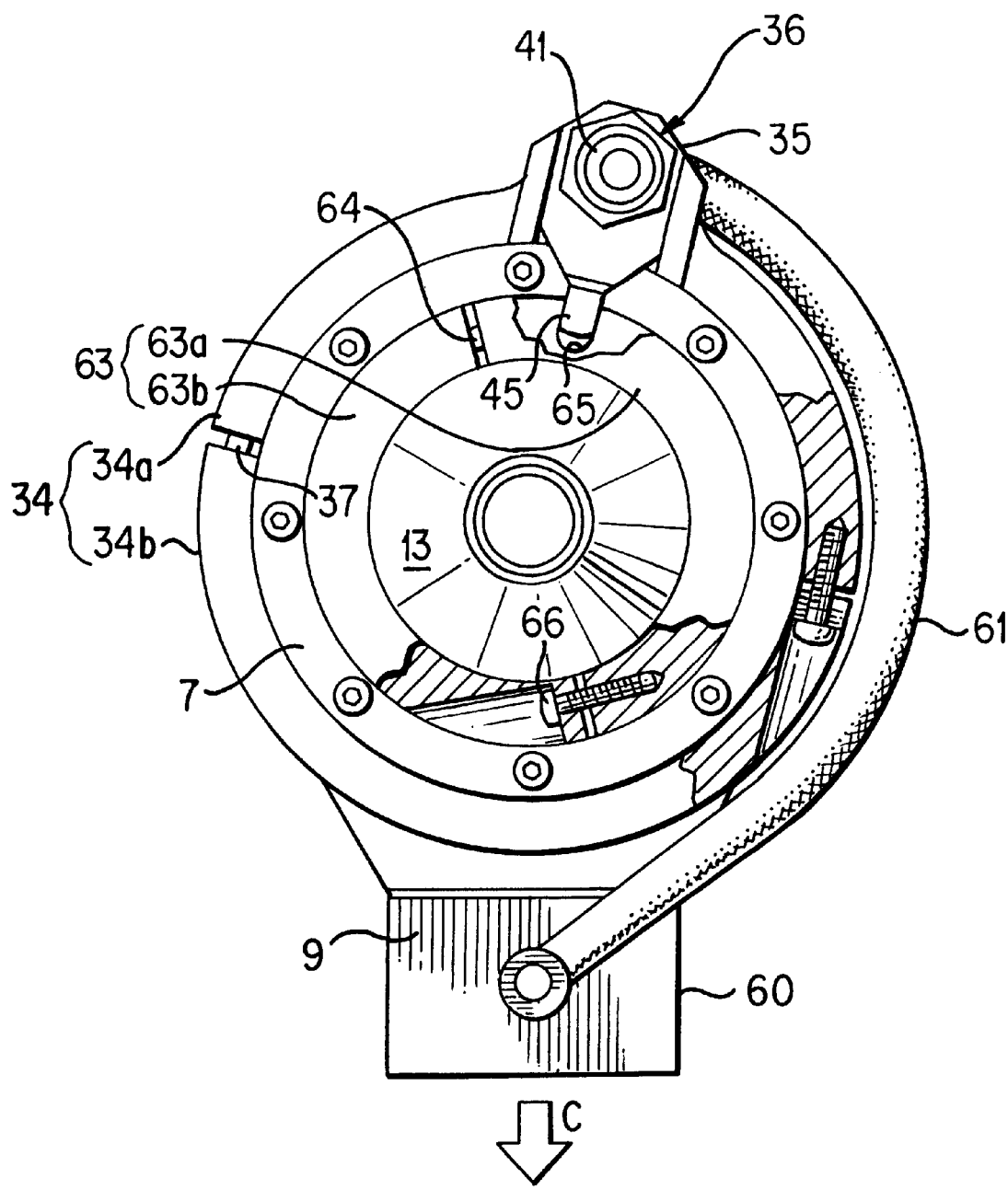
FIG. 5 is a partial plan view of the rotary cutter shown in FIG. 4 viewed from the base.
Figure 6:
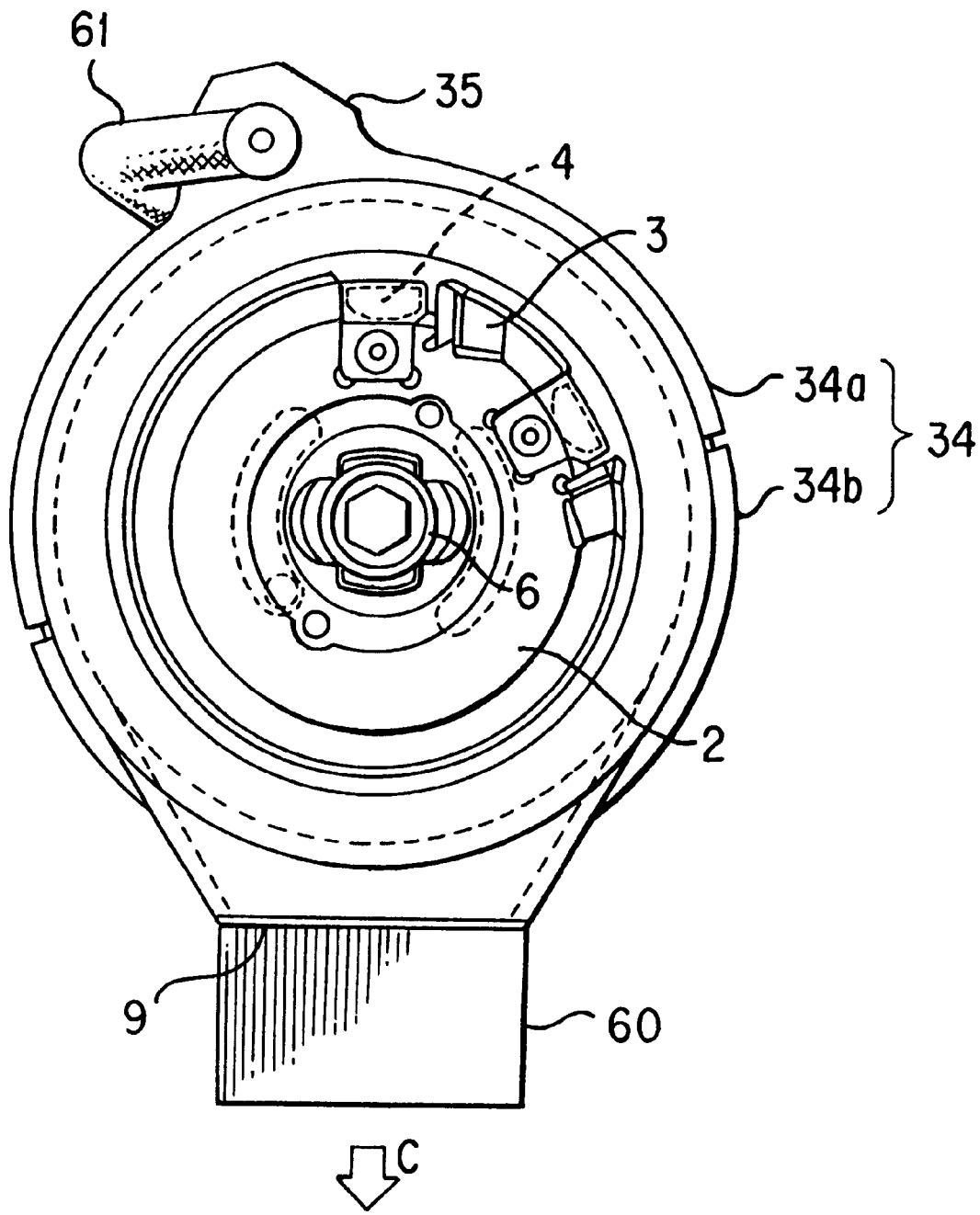
FIG. 6 is a bottom plan view of the rotary cutter shown in FIG. 4 viewed from the top.
Figure 7:
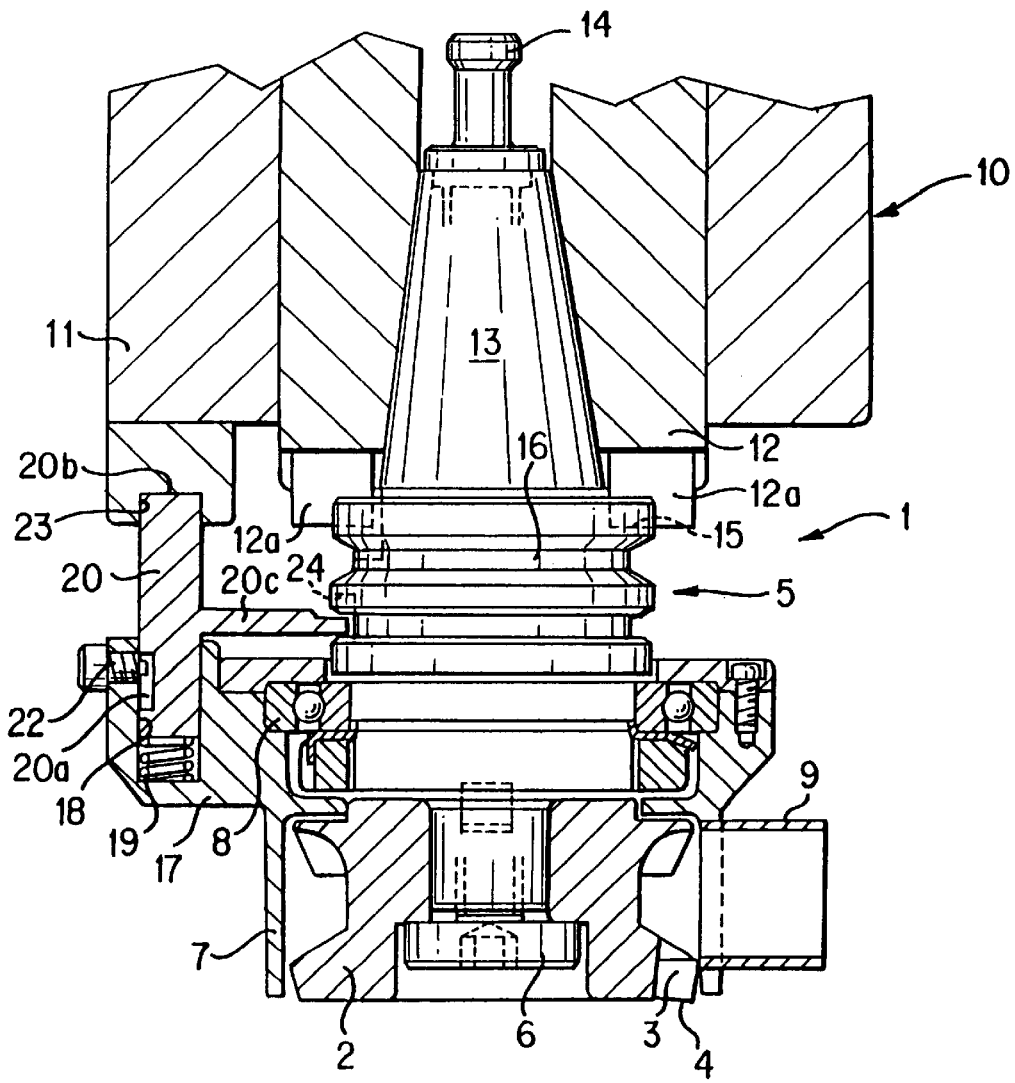
FIG. 7 is a sectional view of a conventional rotary cutter mounted on a machine tool.

Next, a second embodiment of the present invention will be described with reference to FIGS. 4 to 6. The same reference numerals will be used for the parts which are the same as those of the first embodiment, and a description thereof will be omitted. FIG. 4 is a longitudinal sectional view showing the main part of a rotary cutter as the second embodiment. FIG. 5 is a partial plan view of the rotary cutter shown in FIG. 4 viewed from the base, and FIG. 6 is a bottom plan view of the rotary cutter shown in FIG. 4 viewed from the top.

In accordance with the second embodiment, an air amplifier 60 is connected to an outlet 9 of a chip container 7, and a hole 51 formed on the bottom of an extended section 35 of a block ring 34 and the air amplifier 60 are connected via an air hose 61. The air hose 61 curves along the peripheral area of the chip container 7.

Also, in accordance with this embodiment, instead of a flange 47 of an arbor 5, a flange ring 63 (supporting member) is detachably mounted on the arbor 5. The flange ring 63 includes one pair of semicircular rings 63a and 63b which are hinged with a hinge 64, and they are mounted on the arbor 5 and closed with a bolt 66. A recess 65 (or a plurality of recesses) for engaging a positioning arm 45 is formed on one semicircular ring 63a.

The flange ring 63 can be mounted so that the recess 65 faces the positioning arm 45 in response to the positional adjustment by the block ring 34.

Accordingly, while the arbor 5 is mounted on the machine tool 10, compressed air fed from the air feeder in the machine tool 10 is blasted into the air amplifier 60 which is connected to the outlet 9 to generate an air flow toward the exterior of the air amplifier 60 (in the direction shown by an arrow C). Thus, the interior of the chip container 7 has a negative pressure, resulting in an air flow from the chip container 7 toward the exterior.

Thereby, the chips led into the chip container 7 during cutting are sucked and repelled out of the outlet 9 because of the air flow by the air amplifier 60, and are removed with a conveyor 28 or the like.

Although, in the embodiments described above, the air flow passing through the through-hole 43 of the positioning pin 41 is fed into the air feed pipe 52 or the air amplifier 60, it is to be understood that the invention is not limited to the disclosed embodiments. The air flow may be fed into both the air feed pipe 52 and the air amplifier 60 so that the blast flow and the suction flow simultaneously affect the chips in the chip container 7. This further improves chip recovery efficiency.

Also, in the embodiments described above, the chips repelled out of the outlet 9 are recovered with the conveyor 28, however, it is to be understood that the invention is not limited to the disclosed embodiments, and other appropriate chip recovery means, for example, a recovery box may be adopted.

Also, although a rotary cutter in accordance with the present invention is most suitable when used for an automatic tool exchange apparatus, it may be used for a manual exchange or the like.

As described above, in the rotary cutter having a chip-repelling mechanism in accordance with the present invention, the positioning member is detachably mounted on the chip container by the fitting member, and the positioning member can be adjusted in a peripheral direction in response to the mounting position of the fitting member. Therefore, even when, for example, a key or a key seat of the machine tool and a part of the machine tool for connecting the positioning member do not correspond to a key seat or a key of the arbor and the position of the positioning member, an alignment can be performed by adjusting the position of the positioning member in a peripheral direction, and even when the position of the outlet is deviated, it can be adjusted.

Also, the position of the positioning member to the outlet in a peripheral direction can be adjusted. Therefore, when, for example, the positions of a conveyor for transporting chips, a chip recovery box, and the like are predetermined, the outlet of the chip container must be set to face toward them, and even in such a case, by adjusting the positioning member in a peripheral direction of the chip container, the positioning member and the key seat or the key of the arbor can be easily aligned with the machine tool.

Also, the arbor is mounted on the cutter body, and the arbor and the machine tool are connected so as to be integrally rotated by fitting a key of either into a key seat of another, and also the position of the positioning member to the key seat or the key of the arbor in a peripheral direction can be adjusted. Therefore, even if the position of the outlet of the chip container is predetermined, the angular position of the positioning member in a peripheral direction to the key seat or the key of the arbor can be freely adjusted by the fitting member, thus enabling correspondence to any type of machine tool.

The positioning member is provided with the retainer and the arbor is provided with the engaging section which is engageable with the retainer, and a plurality of engaging sections are provided in a peripheral direction of the arbor. Or, the positioning member is provided with the retainer and the arbor is provided with the supporting member having the engaging section which is engageable with the retainer in a detachable manner, and also the position of the engaging section can be adjusted in a peripheral direction in response to the mounting position of the supporting member. Therefore, in either case, when the position of the positioning member is moved in a peripheral direction, by adjusting the position of the engaging section of the arbor in response to this, the relative rotation between the arbor and the chip container can be resisted while the rotary cutter is not mounted on the machine tool.

Also, the through-hole for passing air fed from the machine tool is formed on the positioning member so that the air passing through the through-hole is fed into the air amplifier provided in at least one of either the chip container or on the outlet via the air channel. Therefore, by using the connecting mechanism between the chip container and the machine tool also as the air feeding mechanism, the structure of the air feeding mechanism can be simplified, enabling a decrease in the occupied space.

Obviously, numerous modifications and variations of the present invention are possible in light of the above teachings. It is therefore to be understood that within the scope of the appended claims, the invention may be practiced otherwise than as specifically described herein.

We claim:

1. A rotary cutter having a chip-repelling mechanism, comprising:

a cutter body having cutting edges on its top periphery;

a chip container having a chip outlet, said chip container being provided around a peripheral area of said cutter body; and a positioning member provided on said chip container, said positioning member being connected to a machine tool when an arbor mounted on said cutter body is connected to said machine tool, wherein said positioning member is detachably mounted on said chip container by a fitting member, and said positioning member is adjustable in a peripheral direction in response to a mounting position of said fitting member.

2. A rotary cutter having a chip-repelling mechanism according to claim 1, wherein a position of said positioning member to said chip outlet in the peripheral direction is adjustable.

3. A rotary cutter having a chip-repelling mechanism according to claim 1, wherein said arbor and said machine tool are connected to each other so as to be integrally rotated by fitting a key of one of said arbor and said machine tool into a key seat of the other one of said one of said arbor and said machine tool, and a position of said positioning member to one of said key seat and said key of said arbor in the peripheral direction is adjustable.

4. A rotary cutter having a chip-repelling mechanism according to claim 2, wherein said arbor and said machine tool are connected to each other so as to be integrally rotated by fitting a key of one of said arbor and said machine tool into a key seat of the other one of said one of said arbor and said machine tool, and a position of said positioning member to one of said key seat and said key of said arbor in the peripheral direction is adjustable.

5. A rotary cutter having a chip-repelling mechanism according to claim 1, wherein said positioning member is provided with a retainer, said arbor is provided with an engaging section which is engageable with said retainer, and a plurality of said engaging sections are provided in a peripheral direction of said arbor.

6. A rotary cutter having a chip-repelling mechanism according to claim 2, wherein said positioning member is provided with a retainer, said arbor is provided with an engaging section which is engageable with said retainer, and a plurality of said engaging sections are provided in a peripheral direction of said arbor.

7. A rotary cutter having a chip-repelling mechanism according to claim 3, wherein said positioning member is provided with a retainer, said arbor is provided with an engaging section which is engageable with said retainer, and a plurality of said engaging sections are provided in a peripheral direction of said arbor.

8. A rotary cutter having a chip-repelling mechanism according to claim 1, wherein said positioning member is provided with a retainer, said arbor is provided with a supporting member having an engaging section which is engageable with said retainer in a detachable manner, and a position of said engaging section being adjustable in a peripheral direction in response to a mounting position of said supporting member.

9. A rotary cutter having a chip-repelling mechanism according to claim 2, wherein said positioning member is provided with a retainer, said arbor is provided with a supporting member having an engaging section which is engageable with said retainer in a detachable manner, and a position of said engaging section being adjustable in the peripheral direction in response to a mounting position of said supporting member.

10. A rotary cutter having a chip-repelling mechanism according to claim 3, wherein said positioning member is provided with a retainer, said arbor is provided with a supporting member having an engaging section which is engageable with said retainer in a detachable manner, and a position of said engaging section being adjustable in the peripheral direction in response to a mounting position of said supporting member.

11. A rotary cutter having a chip-repelling mechanism according to claim 1, wherein said positioning member is provided with a through-hole for conducting air fed from said machine tool, and the air passing through said through-hole is fed into an air amplifier provided in at least one of said chip container and said chip outlet.

12. A rotary cutter having a chip-repelling mechanism according to claim 2, wherein said positioning member is provided with a through-hole for conducting air fed from said machine tool, and the air passing through said through-hole is fed into an air amplifier provided in at least one of said chip container and said chip outlet.

13. A rotary cutter having a chip-repelling mechanism according to claim 3, wherein said positioning member is provided with a through-hole for conducting air fed from said machine tool, and the air passing through said through-hole is fed into an air amplifier provided in at least one of said chip container and said chip outlet.

14. A rotary cutter having a chip-repelling mechanism according to claim 4, wherein said positioning member is provided with a through-hole for conducting air fed from said machine tool, and the air passing through said through-hole is fed into an air amplifier provided in at least one of said chip container and said chip outlet.

15. A rotary cutter having a chip-repelling mechanism according to claim 1, wherein said cutter body is detachably mountable on said machine tool by means of an automatic tool exchange apparatus.

16. A rotary cutter having a chip-repelling mechanism according to claim 2, wherein said cutter body is detachably mountable on said machine tool by means of an automatic tool exchange apparatus.

17. A rotary cutter having a chip-repelling mechanism according to claim 3, wherein said cutter body is detachably mountable on said machine tool by means of an automatic tool exchange apparatus.

18. A rotary cutter having a chip-repelling mechanism according to claim 5, wherein said cutter body is detachably mountable on said machine tool by means of an automatic tool exchange apparatus.

19. A rotary cutter having a chip-repelling mechanism according to claim 8, wherein said cutter body is detachably mountable on said machine tool by means of an automatic tool exchange apparatus.

20. A rotary cutter having a chip-repelling mechanism according to claim 11, wherein said cutter body is detachably mountable on said machine tool by means of an automatic tool exchange apparatus.

* * * * *